April 2, 1963 W. J. IVES ETAL 3,083,898

APPARATUS FOR VERIFYING THE OPERATION OF A TAPE REPERFORATOR PHOTOELECTRICALLY

Filed June 15, 1960 2 Sheets-Sheet 1

Inventors
W. J. IVES
J. RYWAK
J. N. REID

By Robert B. Hamman
Attorney

Inventors
W. J. IVES
J. RYWAK
J. N. REID
By Robert B. Harmon
Attorney

United States Patent Office 3,083,898

Patented Apr. 2, 1963

3,083,898

APPARATUS FOR VERIFYING THE OPERATION OF A TAPE REPERFORATOR PHOTOELECTRICALLY

Walter J. Ives, John Rywak, and John N. Reid, Belleville, Ontario, Canada, assignors to Northern Electric Company, Limited, Montreal, Quebec, Canada, a corporation of Canada Filed June 15, 1960, Ser. No. 36,203

1 Claim. (Cl. 234—34)

This invention relates to an apparatus for sensing and verifying coded data on perforated tape and more particularly to an apparatus having means to sense and verify tape photoelectrically.

In telegraph systems and high speed systems such as computers, calculators and business machines, punched tape is widely used for recording coded data. The coded data can be in the form of transverse rows of perforations formed in the tape either by a keyboard perforator or by a signal controlled perforator commonly referred to as a reperforator. In order to verify the operation of a reperforator, a set of sensing elements can be employed to sense transverse areas of the perforated tape to determine the presence or absence of perforations in each position of the tape. The information detected from the sensing elements then can be electrically fed to a comparator circuit which compares this information with the control signals utilized to operate the reperforator.

Sensed perforated tape also can be compared with data punched in another tape such as an incoming tape to a teletype message sorter. Instead of comparing the information detected by the sensing elements with the control signals utilized to operate the reperforator, the detected information can be compared with the data in the incoming tape which also has been sensed by well known optical reading devices.

Information sensed at the output of a tape reperforator also can be utilized to control the transmission of pulses such as in a telegraph transmitter.

Well known prior art devices sense the punched tape several characters after the tape has been punched by the reperforator. Because of this, some electrical storage means is required to store the control signals utilized to operate the reperforator or to store the signals read from another tape before a comparison with the perforated tape can be made.

Under such conditions, a short length of tape containing a group of perforations extends between the reperforator and the sensing elements. In order to sense the last few groups of perforations, a blank tape represented by the distance between the reperforator and the sensing elements is passed through the sensing elements and line time commensurate with such length of blank tape is consumed, with the consequent transmission of no intelligence.

Other prior art devices such as disclosed in U.S. Patent No. 2,382,251 to R. D. Parker et al. utilize a sensing mechanism that is made movable along the tape such that the entrance channel of the sensing device can be located immediately adjacent to the exit channel of a perforator.

Still other prior art devices utilizing such means as magnetic or ceramic pickups directly sense the operation of the punch pins. The inherent disadvantage of these devices is that they fail to sense whether or not a punched perforation has been made in the tape.

It is an object of this invention to describe a reperforator verifier which senses the transverse area of a perforated tape in the same operation cycle as the reperforator punches the tape.

Another object of this invention is to describe a device that will successively sense by photoelectric means signals corresponding to each transverse row of perforations in a tape and to electrically transmit the signals so sensed to a comparator circuit where they are compared with the control signals utilized to operate the reperforator.

Another object of this invention is to provide a rugged, compact, simply constructed and reliable means for verifying the output of a tape reperforator.

These and other objects of this invention are attained in one embodiment of the invention by advancing a tape to a reperforator wherein perforations are punched in the tape as it passes under the punches, providing means for advancing the tape such that the tape that was perforated appears at a sensing station during the same punching cycle, the sensing station consisting of a light source positioned below the tape which passes light through the perforations in the paper to a bank of photoelectric semiconductor diodes to energize the diodes. The diodes are electrically connected to a comparator circuit well known to the art for comparing the sensed information with the control signals that operate the reperforator. The sensing station is located physically within the punch block assembly of the reperforator adjacent to the punches at a distance equal to the distance between transverse rows of perforations. The perforator to which the invention has been specifically applied is of the high speed type such as disclosed in U.S. Patent No. 2,675,078 to W. J. Zenner.

Other objects and advantages of this invention will become apparent in the following detailed description when read in view of the accompanying drawings where like numbers refer to like parts and in which.

Figure 1:
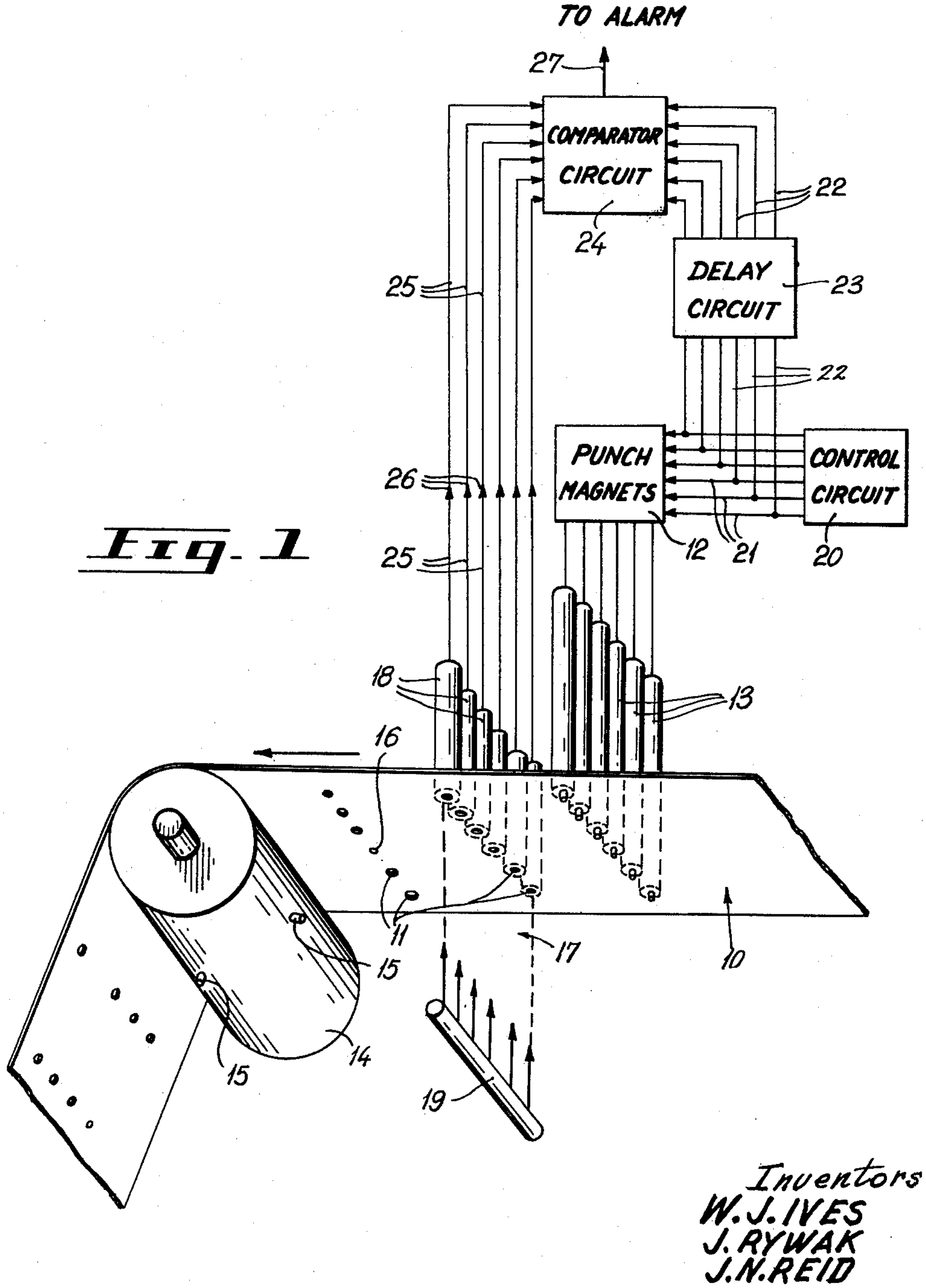
FIG. 1 is a perspective view from beneath a tape being advanced through a reperforator and a sensing station and embodying the principles of the invention.

Referring to the drawings, there is shown in FIG. 1 a tape 10 having a series of transverse perforations 11 therein. The tape 10 is fed to a reperforator which may be of the type disclosed in U.S. Patent No. 2,675,078 to W. J. Zenner. Only portions of the reperforator which will contribute to the better understanding of this invention are shown, these being the punch magnets 12, which when energized control the operation of linkages (not shown) to cause the punches 13 to perforate the tape and a tape feed wheel 14 having projecting teeth 15 which are designed to enter the feed holes 16 pierced in the tape by one of the punches 13 in order to advance the tape forward (to the left in FIG. 1).

Also shown in FIG. 1 is a sensing station 17, located within the reperforator adjacent to and after the punches 13 at a distance equal to the distance between a transverse row of perforations 11 in the tape 10, consisting of a bank of photoelectric semiconductor diodes 18 corresponding in number to the punches 13, located above the tape and arranged in a transverse row across the tape such that the tape perforations appear below the light sensitive surfaces of the diodes 18, and a light source 19 located beneath the tape such that light will impinge upon the light sensitive surfaces of diodes 18 through the perforations 11 in the tape 10.

Also shown in FIG. 1 is a control circuit 20 having individual leads 21 connected to the punch magnets 12 of the reperforator and individual leads 22 connected through a delay circuit 23 to a comparator circuit 24 of a type well known to the art for comparing electrical data from two different sources. The delay circuit 23 is arranged electrically to prevent each sequence of signals from the control circuit 20 from reaching the comparator circuit 24 only until the punches 13 have perforated the tape in response to the same sequence of signals and the tape has stepped once to the sensing station 17. The control circuit 20 may may include any means capable of energizing leads 21 or 22 permutatably. The outputs from each of diodes 18 have individual leads 25 connected through suitable individual amplifiers 26 to the comparator circuit 24, the output from the comparator circuit 24 being connected to a suitable alarm, either visual, audible or recorded through lead 27.

Figure 2:
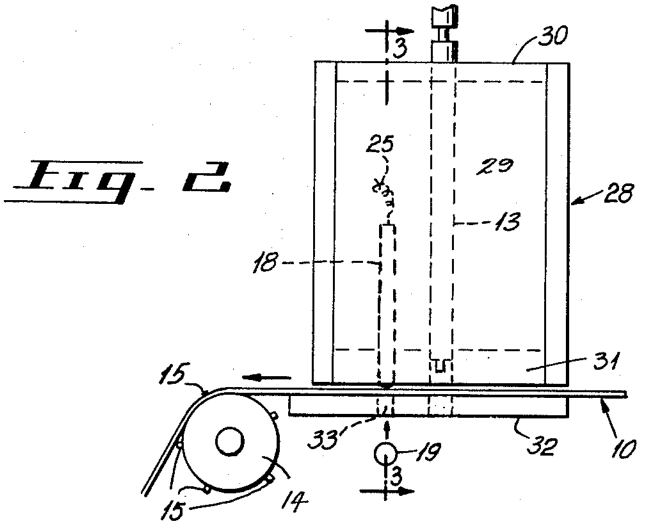
FIG. 2 shows a side elevation view of a punch block assembly incorporating the features of the invention.
Figure 3:
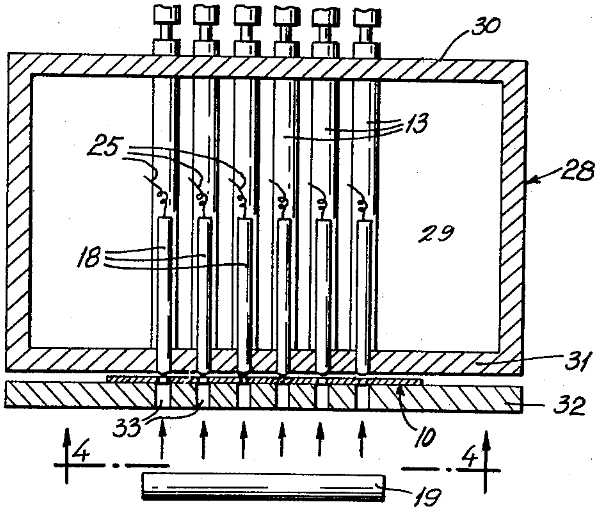
FIG. 3 is a sectional view taken along line 3—3 of FIG. 2.

There is shown in FIGS. 2 and 3 a punch block assembly 28 having a cavity 29 therein and a set of punches 13 movable through openings in upper and lower guide plates 30 and 31 and cooperating with a die plate 32, the plates 31 and 32 being spaced apart to form a tape guide for a tape 10. The punches 13 are selectively operated by linkages (not shown) corresponding in number to the number of punches. A tape feed wheel 14 having projecting teeth 15 is shown (FIG. 2) for advancing the tape forward. Also shown located within the punch block assembly 28 is a set of photoelectric diodes 18 rigidly mounted by any suitable means such as in cast silicon rubber, with the light sensitive surfaces of the diodes protruding through openings in the guide plate 31 to appear above the tape guide for tape 10 and cooperating with openings 33 in the die plate 32 and a source of light 19 located beneath the openings 33. The openings 33 are sealed with any light conducting material such as the material sold under the trademark Lucite to prevent dust from collecting in these openings immediately under the diodes 18. Individual leads 25 are connected from each of diodes 18 for connection to amplifiers (not shown).

Figure 4:
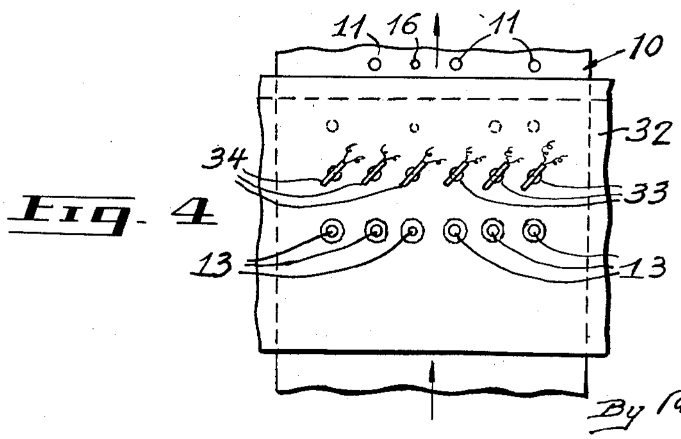
FIG. 4 shows another embodiment of the invention utilizing individual microminiature lamps as the light source in the sensing station and is represented by a bottom view taken along line 4—4 of FIG. 3.

There is shown in FIG. 4 another embodiment of this invention where individual microminature lamps 34 are located beneath and adjacent to the openings 33 of the die plate 32 such that illumination from the lamp filaments will impinge on the light sensitive surfaces of the diodes 18. These lamps can be of the type sold under the trade name "Mite-T-Lite Bulb" manufactured by Sylvania Electric Products or the type sold under the trade name "Pinlight," manufactured by Kay Electric Company. The use of these individual lamps in lieu of a single lamp of much larger size contributes substantially to the compactness and ruggedness of the verifier, as well as to a reduction in power consumed since these lamps can be instantly illuminated by suitable control means only when the reperforator is in operation.

Referring again to FIG. 1 as signals from control circuit 20 are applied to the punch magnets 12 and to the comparator circuit 24 after being delayed in delay circuit 23, the punch magnets 12 are energized causing linkages (not shown) to operate the punches 13 which perforate the tape 10 in response to these signals. When each sequence of signals is completed, the magnets deenergize and the punches 13 are withdrawn from the tape 10 while the tape feed wheel 14 advance the tape 10 one step, the perforations 11 thereby appearing at the sensing station 17 where they are immediately read, amplified and transmitted to the comparator circuit 24 for comparison with the signals from the control circuit 20. Where the information does not agree, the comparator 24 automatically stops the machine and initiates an alarm indicating that the reperforator has made an error. Where no error is detected the process of punching, stepping, reading and verifying continues as long as the control circuit 20 energizes the punch magnets 12 of the reperforator.

What is claimed is:

In a tape reperforator having a plurality of punches adapted to punch coded perforations in transverse rows on a blank tape in a cyclical manner under selective control of signals applied to the punches, apparatus for verifying the operation of the tape reperforator photoelectrically comprising in combination with the tape reperforator: a plurality of photoelectric sensing devices equal in number to the number of punches adapted to sense perforations in transverse rows on a tape to produce output signals representing the sensed perforations, said sensing devices being located adjacent the punches at a distance equal to the distance between transverse rows of perforations punched on the tape, means for advancing the perforated tape so that a row of perforations appears at said sensing devices as soon as the punches are withdrawn from the tape, whereby the perforations are sensed within one operation cycle of the punches, and means adapted to simultaneously apply the output signals from said sensing devices and said control signals to a comparator circuit where agreement between said signals is checked, thereby verifying the operation of the tape reperforator.

References Cited in the file of this patent

UNITED STATES PATENTS

| | | |
|---|---|---|
| 1,578,717 | Daubmeyer | Mar. 30, 1926 |
| 2,224,764 | Dickinson et al. | Dec. 10, 1940 |
| 2,275,396 | Johnson | Mar. 3, 1942 |
| 2,382,251 | Parker et al. | Aug. 14, 1945 |
| 2,438,588 | Tolson | Mar. 30, 1948 |
| 2,870,430 | Hancock | Jan. 20, 1959 |
| 2,958,727 | Barbeau et al. | Nov. 1, 1960 |
| 3,016,186 | Haupt | Jan. 9, 1962 |

FOREIGN PATENTS

| | | |
|---|---|---|
| 79,640 | Netherlands | Nov. 15, 1955 |